United States Patent Office 3,373,161
Patented Mar. 12, 1968

3,373,161
PIPERAZINE DERIVATIVES
Laszlo Beregi, Boulogne-sur-Seine, Pierre Hugon, Rueil-Malmaison, and Jean-Claude Le Douarec, Suresnes, France, assignors to Societe en nom Collectif dite: Science Union et Cie, Societe Francaise de Recherche Medicale, Suresnes, France
No Drawing. Filed Sept. 7, 1965, Ser. No. 485,562
Claims priority, application Great Britain, Sept. 10, 1964, 37,087/64
16 Claims. (Cl. 260—268)

ABSTRACT OF THE DISCLOSURE

Compounds which are 1-(1,1-dialkyl-2-phenyl-ethyl)-piperazines and benzylpiperazines having fluorine or halogenomethyl substituent on the phenyl ring which are useful as analgesics, anorexigencies, and lipid and glucide metabolism regulators, and process for the preparation thereof.

This invention relates to N-(1,1-dialkyl-phenethyl)-piperazines and derivatives thereof.

Many attempts have been made in the past decade to diminish the central stimulating and pressor properties of the 1-phenyl-2-methyl-2-amino-propanes. For instance, the introduction of certain substituents in different positions of the benzene nucleus, has, in fact, resulted in the production of compounds having a pronounced anorexigenic effect and an attenuated degree of central stimulating activity, but the hypertensive effect has still remained (see, for example, Acta pharmacol. et toxicol. (1960), 17, 121–136).

The present invention is based on the surprising observation that the piperazine derivatives of 1-phenyl-2-alkyl-2-amino-alkanes, for example, 1-phenyl-2-methyl-2-amino-propanes, possess valuable and remarkably diverse pharmacological activities. Such derivatives are N-(1,1-dialkyl-phenethyl)-piperazine in which the alkyl group in the 1-position of the alkane chain contains from 1 to 4 carbon atoms, and the phenyl nucleus may be unsubstituted or substituted by suitable substituents. More especially the compounds of this invention corresponding to the general Formula I given below are very potent analgesic agents; they manifest also anorexigenic, muscle-relaxant and tranquillising activities, and influence the glucide and lipid metabolism.

These pharmacological properties of the compounds of the present invention are quite unlike those of related tertiary amines, and even diametrically opposed to those of related primary and secondary amines.

The present invention provides compounds of the general formula

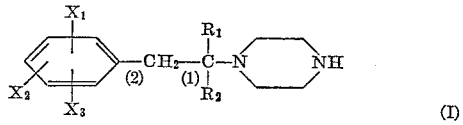

(I)

in which $X_1$, $X_2$ and $X_3$ each represent a hydrogen, fluorine, chlorine or bromine atom; or a lower alkyl radical, for example, a methyl or ethyl group, a hydroxyl group; a lower alkoxy radical, for example, a methoxy, ethoxy or isopropyloxy group, or a halogenomethyl group, for example, a trifluoromethyl group. The substituents, when more than one is present, may be the same or different, and they may be present in any of the available positions in the phenyl nucleus. The benzene ring may even contain more than three substituents, the further substituents being the same as those given in the above definition of $X_1$, $X_2$ and $X_3$.

$R_1$ and $R_2$ in the above formula may be the same or different and each represents a saturated lower aliphatic hydrocarbon radical containing from 1 to 4 carbon atoms such, for example, as a methyl, ethyl, propyl, isopropyl, butyl or isobutyl group.

The present invention also includes acid addition salts of the above compounds obtainable by reaction with organic or inorganic acids and yielding therapeutically active compounds as, for example, hydrohalic acids such as hydrochloric, hydrobromic or hydroiodic acid; sulphuric, nitric, phosphoric, acetic, propionic, glycolic, pyruvic, oxalic, lactic, malonic, maleic, fumaric, succinic, malic, tartaric, citric, benzoic, mandelic, cinnamic, salicylic, methanesulphonic or ethanesulphonic acid.

The compounds of the invention are new and may be obtained by initially preparing from the appropriate primary amine a benzyl-piperazine and debenzylating it to yield the desired monosubstituted piperazine. This synthetic method is illustrated by the following equation

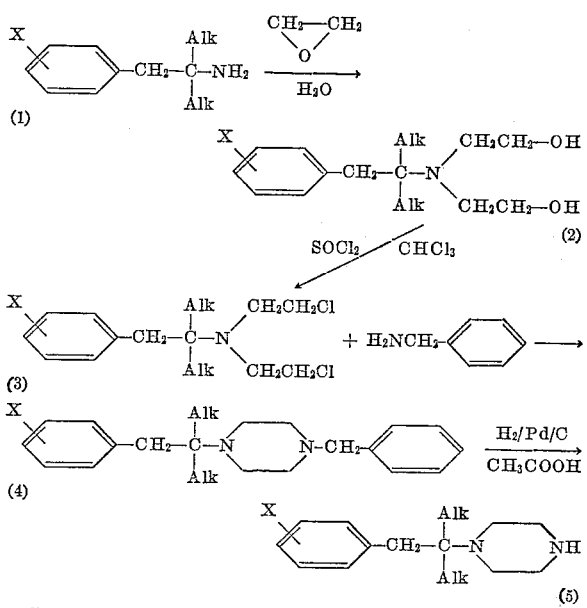

In the above formulae X represents one or more of the substituents $X_1$, $X_2$ and $X_3$ as defined above.

The first step of this synthesis is preferably performed in an autoclave, thus permitting the exclusive production of the desired di-β-hydroxy derivative in an excellent yield. This modification of the prior art method is of industrial importance as it opens the way to the economic production of a wide range of N-monosubstituted derivatives of piperazine.

Heretofore, the intermediate (1) of this synthesis has been prepared by several known methods, for example: (Ritter and al., J. Am. Chem. Soc., 70, p. 4045 (1948); Ferrari Il Farmaco, Ed. Sci., 15, 337 (1960)). A magnesium reagent of a phenyl-methyl halide is reacted with a dialkyl ketone, which may be symmetric or asymmetric and the tertiary alcohol is added to a strongly acid solution of sodium cyanide, using a mixture of acetic acid and sulphuric acid. The so obtained N-formyl amino derivative is hydrolysed.

However, in some cases, when $X_1$ and $X_2$ are other than hydrogen and represent different substituents, and $R_1$ and $R_2$ are methyl, these methods suffer from the disadvantage of being based on very difficulty accessible starting materials and of mediocre yields. Furthermore, the use of classical procedures is extremely inconvenient when one or both $X_1$ and $X_2$ and the $CF_3$ group, $X_3$ being hydrogen.

The present invention also provides a new process for the production, in a simple way and with good yields, of 1-phenyl-2-alkyl-2-amino-alkanes in which the alkyl group and alkane radical are as defined above and the phenyl nucleus may be unsubstituted or substituted.

The following scheme illustrates the preparation of these amines, in accordance with the present invention

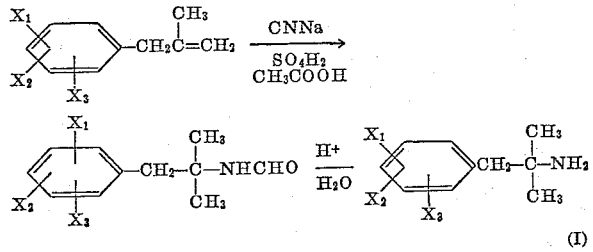

(I)

The 1-phenyl-2-methyl-2-propanes used as starting materials, in which $X_1$, $X_2$ and $X_3$ have the previously given meaning, may be prepared in excellent yields by reacting methallyl chloride with the appropriate phenyl-magnesium bromide.

The new derivatives which are the object of the invention have interesting pharmacological and therapeutic properties and may be used as medicines.

Among these properties it is particularly interesting to note the analgesic and anorexia-inducing effect, as well as the effect on the liquid and carbohydrate metabolism.

Their relatively slight toxicity allows them to be used with an important margin of safety, in the treatment of pain, obesity, diabetes or pre- and para-diabetic conditions.

It has been found that the analgesic effect, studied by Haffner's method achieves 50% inhibition of perception of pain at doses of 25 to 50 mg./kg., whereas in the same experiments the figure for pyramidon is 88 mg./kg.

The anorexia-inducing effect is of equal importance and is not accompanied by excitation phenomena as is the case with most appetite inhibitors.

In the treatment of animals one also observes a lypolytic action which manifests itself in a noticeable reduction in lipid reserves, particularly of epididymal fat.

The derivatives which are the object of the invention increase the peripheral assimilation of glucose at tissue level. This property, which has been studied by the method of N. Connard (Acta Med. Belg. 1955) manifests itself by an increase of up to 161% in the peripheral glucose assimilation coefficient, and allows these derivatives to be used in hydrocarbon assimilation disturbances of patients suffering from pre-diabetes or diabetes.

The present invention also provides a pharmaceutical preparation, which comprises a N-(1,1-dialkyl-phenethyl)-piperazine of the invention, or a physiologically tolerable acid addition salt thereof, in admixture or conjunction with a pharmaceutically suitable carrier.

The following examples illustrate the invention:

EXAMPLE 1

*1-(3'-trifluoromethyl-phenyl)-2-methyl-2-amino-propane*

In a 3-litre three-necked round bottomed flash equipped with a mercury-sealed stirrer and fitted with a dropping funnel and a thermometer, there were placed 387 parts of 100% acetic acid. Stirring was commenced and the flask and its contents were cooled to 2–5° C., while 167 parts of sodium cyanide were added in 20 minutes. At this point, a solution consisting of 750 parts of concentrated sulphuric acid and of 387 parts of 100% acetic acid was added at such a rate as to maintain the temperature between 2–5° C. After the addition was completed (this step required approximately 90 minutes), the resulting mixture was stirred for one hour and then allowed to warm to room temperature. At this point, 600 parts of 1-(3'-trifluoromethyl-phenyl) - 2 - methyl - 2-propene was added dropwise and the mixture maintained between 2–5° C. (this step required approximately 2 hours). At the end of this period the solution was allowed to warm to room temperature and was then heated to 70° C. for an additional 90 minutes. Upon completion of this step, the reaction mixture was poured on to ice. The mixture was extracted with 3,000 parts of diethyl ether, the organic layer washed twice with a portion of 1,000 parts of water, 1,000 parts of 2 N sodium hydroxide solution and finally twice with a portion of 1,000 parts of water. The extract was dried over sodium and the solvent distilled. The residue was distilled in vacuo to obtain 545 parts of 1-(3'-trifluoromethyl-phenyl)-2-methyl-2-formylamino propane, which boiled at 125–128° C. at 0.75 mm. M.P. 58–60° C.

433 parts of this product mixed with 600 parts of concentrated hydrochloric acid, 350 parts of water and 1,900 parts of 95% ethanol were heated under reflux for 5 hours. After the reaction was completed, the resulting mixture was evaporated to dryness. The solid residue was dissolved in 4,000 parts of water, extracted with two 500 part portions of diethyl ether. The aqeuous layer was treated with 600 parts of 4 N sodium hydroxide solution, and finally extracted with 2,000 parts of diethyl ether. The ethereal extract was then washed with two 500 part portions of water, dried over anhydrous sodium sulphate. The solvent being removed, the residue was distilled in vacuo. In this manner, there was obtained a 360 parts yield (94%) of 1-(3'-trifluoromethyl-phenyl)-2-methyl-2-amino propane, B.P. 90° C. at 12 mm., $n_D^{25}$ 1.4563.

By a similar way there were prepared:

1-(2'-trifluoromethyl - phenyl) - 2 - methyl - 2 - amino propane from 1-(2'-trifluoromethyl-phenyl)-2-methyl-2-propene. The product distilled at 90–95° C. at 15 mm. $n_D^{25}$ 1.4651.

1 - (4' - trifluoromethyl - phenyl)-2-methyl-2-amino propane from 1-(4'-trifluoromethyl-phenyl)-2-methyl-2-propene.

1-(2'-fluoro-phenyl) - 2-methyl-2-amino propane from 1-(2'-fluoro-phenyl)-2-methyl-2-propene. The product distilled at 93–96° C., at 18 mm., $n_D^{25}$ 1.4960.

1-(3'-fluorophenyl)-2-methyl-2-amino propane from 1-(3'-fluoro-phenyl)-2-methyl-2-propene. The product distilled at 93–96° C., at 18 mm., $n_D^{25}$ 1.4960.

1-(4'-fluoro-phenyl)-2-methyl-2-amino propane from 1-(4'-fluoro-phenyl)-2-methyl-2-propene. The product distilled at 94–95° C. at 13 mm., $n_D^{25}$ 1.4918.

1-(4'-methoxy-phenyl)-2-methyl-2-amino propane from 1-(4'methoxy-phenyl)-2-methyl-2-propene.

EXAMPLE 2

*N-(1,1-dimethyl-3'-trifluoromethyl-phenethyl)-piperazine*

In a 1 litre stainless steel autoclave there were placed 300 parts of 1-(3'-trifluoromethyl-phenyl)-2-methyl-2-amino-propane, 132 parts of ethylene oxide and 70 parts of water. The mixture was then warmed to 100–110° C. for 6 hours. At the end of this period, the water was eliminated in vacuo and the residue placed in a 2 litre three-necked round bottomed flask equipped with a stirrer and fitted with a dropping funnel and a thermometer. To the di-β-hydroxy derivative so obtained, 675 parts of anhydrous chloroform were added and the solution was warmed to 40–45° C. At this point, a solution consisting of 336 parts of thionyl chloride and 150 parts of anhydrous chloroform was introduced while stirring (this step required approximately 2 hours). The mixture was then heated progressively to its boiling point and then refluxed for an additional hour. The chloroform was removed in vacuo and the residue washed with 1500 parts of diethyl ether.

To the di-β-chloro derivative, there was then added 537 parts of benzylamine and 1420 parts of dimethyl formamide. The mixture was heated to 130–135° C. for 6 hours. Upon completion of this step, the reaction mixture was evaporated to dryness. The solid residue was dissolved in 4500 parts of water, rendered alkaline by addition of sodium hydroxide pellets and finally extracted with 3,000 parts of diethyl ether. The ether solution was dried with anhydrous magnesium sulphate, and the ether was evaporated. The residue distilled in vacuo at 185–190° C. at 1 mm. was N-(1,1-dimethyl-3'-trifluoromethylphenethyl)-N'-benzyl piperazine. 87 parts of this product were mixed with 500 parts of 100% acetic acid and 10 parts of 10% palladium on charcoal and the suspension placed in an autoclave of 2 litre capacity. An initial hydrogen pressure of about 70 lbs. was applied and the mixture heated to 70° C. The reaction required about one hour. The catalyst was allowed to seattle and the actic acid was removed in vacuo. The residue was treated by 250 parts of water and alkalinised with a 4 N sodium hydroxide solution and extracted twice with 250 parts of diethyl ether. The organic layer was washed with 100 parts of water, the extract dried over potassium carbonate and the solvent removed. The residue, N-(1,1-dimethyl-3'-trifluoromethyl-phenethyl)-piperazine (48 parts), distilled at 132–135° C. at 1.5 mm. $n_D^{25}$ 1.4948. The M.P. of the corresponding dihydrochloride was 220° C. (ethanol).

EXAMPLE 3

*N-(1,1-dimethyl-2'-trifluoromethyl-phenethyl)-piperazine*

This compound was prepared by the procedure of Example 2 employing 1-(2' - trifluoromethyl-phenyl)-2-methyl-2-amino-propane instead of 1-(3'-trifluoromethyl-phenyl)-2-methyl-2-amino-propane.

EXAMPLE 4

*N-(1,1-dimethyl-4'-trifluoromethyl-phenethyl)-piperazine*

The procedure of Example 2 was repeated but employant 1-(4'-trifluoromethyl - phenyl)-2-methyl-2-aminopropane as the starting material.

EXAMPLE 5

*N-(1,1-dimethyl-2'-fluoro-phenethyl)-piperazine*

This compound was prepared by the procedure of Example 2 but employing 1-(2'-fluoro-phenyl)-2-methyl-2-amino-propane as starting material. The product distilled at 120–121° C. at 0.65 mm. M.P. of the corresponding dimethane sulphonate is 240–242° C. (ethanol).

EXAMPLE 6

*N-(1,1-dimethyl-3'-fluoro-phenethyl)-piperazine*

The procedure of Example 2 was repeated but employing 1-(3'-fluoro-phenyl) - 2 - methyl-2-amino-propane as starting material. The product distilled at 122–125° C. at 0.8 mm. M.P. of the corresponding dimethane sulphonate is 214–216° C. (isopropanol).

EXAMPLE 7

*N-(1,1-dimethyl-4'-fluoro-phenethyl)-piperazine*

This compound was prepared by the procedure of Example 2 but employing 1-(4'-fluorophenyl)-2-methyl-2-amino-propane as stating material. The product distilled at 132–134° C. at 1 mm. The M.P. of the corresponding hydrochloride is 248° C. (ethanol).

EXAMPLE 8

*N-(1,1-dimethyl-4'-methyl-phenethyl)-piperazine*

The procedure of Example 2 was repeated but employing 1-(4'-methyl-phenyl)-2-methyl-2-amino-propane as starting material. The product distilled at 148–152° C. at 1.5 mm. M.P. of the corresponding dihydrochloride is 296–298° C. (acetic acid).

EXAMPLE 9

*N-(1,1-dimethyl-2'-chloro-phenethyl)-piperazine*

This compound was prepared by the procedure of Example 2 but employing 1-(2'-chloro-phenyl)-2-methyl-2-amino-propane as starting material. The product distilled at 143–145° C. at 0.95 mm. M.P. of the corresponding dimethane sulphonate is 205° C. (ethanol).

What we claim is:

1. The compound 1-(1,1-dimethyl-(3'-trifluoromethyl-phenethyl))-piperazine.
2. The compound N-(1,1-dimethyl-4'-fluoro-phenethyl)-piperazine.
3. The compound N - (1,1-dimethyl-3'-fluoro-phenethyl)-piperazine.
4. The compound N - (1,1-dimethyl-2'-fluoro-phenethyl)-piperazine.
5. A process of producing new 1-(1,1-dialkyl-2-phenyl-ethyl)-piperazine compounds of the general Formula I

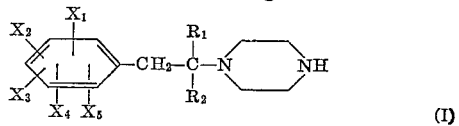

in which $X_1$, $X_2$, $X_3$, $X_4$, and $X_5$ each individually represent hydrogen, fluorine, chlorine, bromine, lower-alkyl, hydroxyl, lower-alkoxy, or halogenomethyl, $R_1$ and $R_2$ represent saturated lower-aliphatic hydrocarbon radicals individually containing from 1 to 4 carbon atoms each, and acid addition salts thereof, which comprises the steps of (a) heating under pressure ethylene oxide, water, and a 1-(1,1-dialkyl-2-phenethyl)-amine of the Formula II

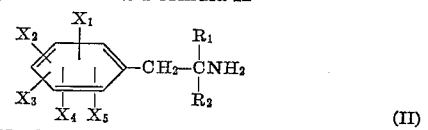

in which $X_1$, $X_2$, $X_3$, $X_4$, $X_5$, $R_1$ and $R_2$ are as defined above, to produce a bis-hydroxyalkylamine, (b) replacing the hydroxyl groups of the said hydroxyalkylamine by chlorine by treatment with thionyl chloride, (c) forming the piperazine ring by cyclization with benzylamine, and finally (d) effecting hydrogenolysis of the benzyl group in the presence of a palladium catalyst and hydrogen.

6. The process of claim 5 wherein step (a) is conducted by heating the reactants together in an autoclave.
7. The process of claim 5 wherein the cyclization (c) is conducted at a temperature not exceeding about 135 degrees centigrade.
8. The process of claim 5 wherein the hydrogenolysis (d) is effected at a temperature of about 70 degrees centigrade in the presence of acetic acid.
9. The process of claim 5 wherein the starting 1-(1,1-dialkyl-2-phenethyl)amine is 1-(3'-trifluoromethylphenyl)-2-methyl-2-aminopropane and the product is N-(1,1-dimethyl-3'-trifluoromethylphenethyl)-piperazine.
10. The process of claim 5, wherein the starting 1-(1,1-dimethyl-2-phenylethyl)-amine is produced from a 1-phenyl-2-methyl-2-propane by reacting the same with sodium cyanide in a mixture of acetic acid and a mineral acid and hydrolyzing the thus-obtained N-formylamino derivative with water in the presence of concentrated hydrochloric acid and ethanol.
11. The process of claim 10 wherein the mineral acid is sulfuric acid and wherein the hydrolysis reaction is assisted by applying heat.
12. A compound selected from the group consisting of (a) 1-(1,1-dialkyl-2-phenyl-ethyl)-piperazines of the general Formula I

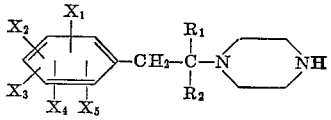

in which $X_1$, $X_2$, $X_3$, $X_4$, and $X_5$ are each individually selected from the group consisting of hydrogen, fluorine, and halogenomethyl, at least one of said substituents being fluorine or halogenomethyl, and R₁ and R₂ each represent a saturated lower-aliphatic hydrocarbon radical individually containing 1 to 4 carbon atoms, inclusive, and (b) pharmaceutically acceptable acid addition salts thereof.

13. The compound N-(1,1-dimethyl-2'-trifluoromethyl-phenethyl)-piperazine.

14. The compound N-(1,1-dimethyl-4'-trifluoromethyl-phenethyl)-piperazine.

15. A compound selected from the group consisting of
(a) 1-(1,1-dialkyl-2-phenyl-ethyl)-benzylpiperazines of the general formula

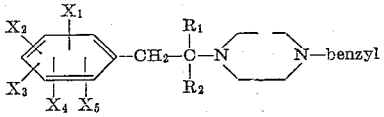

in which $X_1$, $X_2$, $X_3$, $X_4$, and $X_5$ are each individually selected from the group consisting of hydrogen, fluorine, and halogenomethyl, at least one of said substituents being fluorine or halogenomethyl, and R₁ and R₂ each represent a saturated lower-aliphatic hydrocarbon radial individually containing 1 to 4 carbon atoms, inclusive.

16. The compound N-(1,1-dimethyl-3'-trifluoromethyl-phenethyl)-N'-benzylpiperazine.

References Cited

UNITED STATES PATENTS 3,239,528  3/1966  Von Bebenburg _____ 260—268

HENRY R. JILES, *Primary Examiner.*

UNITED STATES PATENT OFFICE
CERTIFICATE OF CORRECTION

Patent No. 3,373,161  March 12, 1968

Laszlo Beregi et al.

It is hereby certified that error appears in the above numbered patent requiring correction and that the said Letters Patent should read as corrected below.

Column 1, line 18, "anorexigencies" should read -- anorexigenics --; line 27, "amino-propanes" should read -- amino propanes --. Column 2, line 47, "ts" should read -- is --; line 57, "Farmaco," should read -- Farmaco. --; line 67, for "difficulty" should read -- difficultly --. Column 3, lines 8 and 9, the right-hand portion of the formula should appear as shown below:

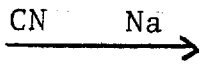

line 29, "liquid" should read -- lipid --; line 61, "flash" should read -- flask --. Column 4, line 43, "93-96° C., at 18 mm. $n_D^{25}$ 1.4960" should read -- 90-92° C., at 12 mm. $n_D^{25}$ 1.4936 --. Column 5, line 12, "seattle" should read -- settle --; line 12, "actic acid" should read -- acetic acid --. Column 7, lines 13 to 15, the right-hand portion of the formula should appear as shown below:

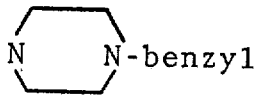

Column 8, line 6, "radial" should read -- radical --.

Signed and sealed this 29th day of July 1969.

(SEAL)
Attest:

EDWARD M. FLETCHER, JR.
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,373,161            Dated March 12, 1968

Inventor(s) Laszlo Beregi, et al.

It is certified that error appears in the above-identified patent and that said Letters Patent are hereby corrected as shown below:

Column 5, line 59, "stating" should read ---starting---.

Column 6, line 5, "compound 1-(1,1" should read

--- compound N-(1,1 ---.

SIGNED AND
SEALED

DEC 2 - 1969

(SEAL)
Attest:

Edward M. Fletcher, Jr.
Attesting Officer

WILLIAM E. SCHUYLER, JR.
Commissioner of Patents